United States Patent [19]

Michael et al.

[11] Patent Number: 5,919,112
[45] Date of Patent: Jul. 6, 1999

[54] MOTOR VEHICLE HAVING AN AUTOMATICALLY SHIFTED TRANSMISSION

[75] Inventors: Joerg Michael, Ingolstadt; Rudolf Ehrmaier, Munich; Josef Neuner, Raubling, all of Germany

[73] Assignee: Bayerische Motoren Werke Aktiengesellschaft, Munich, Germany

[21] Appl. No.: 08/880,681

[22] Filed: Jun. 23, 1997

[30] Foreign Application Priority Data

Jun. 22, 1996 [DE] Germany .............. 196 25 019

[51] Int. Cl.⁶ ..................................... F16H 59/10
[52] U.S. Cl. ............................................. 477/99
[58] Field of Search ........................ 477/97, 99

[56] References Cited

U.S. PATENT DOCUMENTS

| 3,937,105 | 2/1976 | Arai et al. . |
| 4,892,014 | 1/1990 | Morell et al. . |
| 5,562,568 | 10/1996 | Smalw ................................. 477/99 |

FOREIGN PATENT DOCUMENTS

| 0 655 570 | 5/1995 | European Pat. Off. . |
| 38 32 970 | 4/1990 | Germany . |
| 38 42 333 | 4/1990 | Germany . |
| 43 17 257 | 5/1994 | Germany . |
| 43 22 523 | 1/1995 | Germany . |
| 195 06 704 | 2/1996 | Germany . |

OTHER PUBLICATIONS

Japanese Abstract No. 63–62938, M–727, Aug. 5, 1998, vol. 12/No. 286.

Japanese Abstract No. 1–120465, M–859, Aug. 15, 1989, vol. 13/No. 365.

Primary Examiner—Dirk Wright
Attorney, Agent, or Firm—Evenson, McKeown, Edwards & Lenahan, P.L.L.C.

[57] ABSTRACT

A motor vehicle is described which has an engine and an automatically shifted transmission. As an operating element, the transmission has at least one selecting device by which a driver controls an electric transmission control device. As a function of a driving position selected on the selecting device and of other operating parameters of the motor vehicle, the electric transmission control device controls a parking position function of the automatic transmission among other functions. In this case, the parking position will be engaged in the automatically shifted transmission when the driving speed of the motor vehicle is equal to zero and simultaneously the ignition circuit was interrupted by the ignition key and after a predetermined time period has elapsed or when a vehicle door is opened. Alternatively, the parking position is engaged or no later than when the ignition key is removed from the ignition lock.

25 Claims, 2 Drawing Sheets

MOTOR VEHICLE HAVING AN AUTOMATICALLY SHIFTED TRANSMISSION

BACKGROUND AND SUMMARY OF THE INVENTION

The invention relates to a motor vehicle having an automatically shifted transmission and, more particularly, to a motor vehicle having an engine and an automatically shifted transmission, particularly an automatic transmission. As operating elements of the transmission, at least one selecting device is provided, particularly a selector lever, by which a driver controls an electric transmission control device which, as a function of a driving position selected on the selector lever and of other operating parameters of the motor vehicle, controls, among others, a parking position function of the automatic transmission.

German Patent document DE 43 22 523 A1 describes a control device for an automatic motor vehicle transmission in the case of which the operating positions D, R and N are engaged by admitting pressure to individual shifting elements while the operating position P is engaged by switching all shifting elements to be pressureless. In addition, a selecting device with a parking position is coupled via a second control device such that the engaging of the parking position is prevented when the operating step P is not engaged on the selecting device. This is an electro-hydraulic control device which, with the exception of the emergency devices, is controlled only by way of the selecting device.

In contrast, there is needed an automatic control of the parking position function for an automatically shifted transmission of a motor vehicle.

According to the invention, this need is met by a motor vehicle having an engine and an automatically shifted transmission, particularly an automatic transmission. As operating elements of the transmission, at least one selecting device is provided, particularly a selector lever, by which a driver controls an electric transmission control device which, as a function of a driving position selected on the selector lever and of other operating parameters of the motor vehicle, controls, among others, a parking position function of the automatic transmission. The parking position is engaged in the automatic transmission when the driving speed of the motor vehicle is zero, and simultaneously, an ignition circuit was interrupted, particularly by means of an ignition key, and when a predetermined time period has elapsed or when a vehicle door is opened, or no later than when the ignition key is removed from an ignition lock.

According to the present invention, the automatic parking position of an automatically shifted transmission is engaged when the driving speed of the motor vehicle is equal to zero and simultaneously the ignition circuit was interrupted by means of the ignition key, and subsequently a predetermined time period has passed or when a vehicle door was opened, or no later than when the ignition key is removed from the ignition lock.

This has the advantage that the automatic parking position is engaged automatically as a function of additional operating parameters of the motor vehicle if this is necessary. The parking position is only effective when the engine is not running.

In a preferred embodiment of the invention, an engaging of the parking position when the engine is stopped is actively prevented in that a solenoid is used as an impedance element. It is advantageous for the impedance element to exercise its impeding effect only during the engaging of the parking position P in that the release of the parking position is not influenced by the impedance element.

In a further preferred embodiment of the invention, the impedance element is effective only in a one-sided manner; that is, when the parking position is released, it can be bridged independently of its condition. This has the advantage that an emergency release of the parking position is possible also when the automatic parking position fails.

In another advantageous embodiment of the invention, the engaging of the parking position in the automatically shifted transmission is prevented when, by means of the selector lever, the driving position N is selected immediately before the switching-off of the engine or within a predetermined time period after the switching-off of the engine.

In yet another advantageous embodiment of the invention, the parking position is engaged by the force of a prestressed spring. It is released by hydraulic force which, during the release, again prestresses the spring which was relaxed as the result of the engagement.

In a preferred embodiment of the invention, the selector lever can be moved in two operating planes which are situated approximately perpendicularly with respect to one another and in this case always returns automatically into its starting position in the center. It can preferably be moved in the directions of a rectangular system of coordinates. Advantageously, the driving position set at the selector lever will then be displayed to the driver by a display device, in which simultaneously the driving positions for the respective moving direction of the selector lever can also be indicated which are engaged when the selector lever is moved in this direction.

Furthermore, it is advantageous for the display device to include another display plane which extends essentially in parallel to a first display plane of the display device such that more than four different functions can be assigned to four moving directions for the selector lever. All of these functions can be indicated by the display device.

In the case of another advantageous embodiment of the invention, the display of the display device is controlled in all driving positions by the electric transmission control device and the engaged position P is determined by a sensor in the transmission which will then control the display device. In addition, when the ignition is switched off, the electric transmission control device can be switched off when the display device is controlled by the sensor in the transmission. The switching-off of the electric transmission control device and possibly of the display device prevents the consumption of quiescent current. It is particularly advantageous for the display of the display device to be switched off when the ignition is switched off and the position P is engaged after a predetermined time period or when the ignition key is removed from the ignition lock with a switching off of the consuming devices or when the door lock of the motor vehicle is operated.

Another preferred embodiment of the invention contains an operating element by which the driver can engage the parking position. This advantageously causes an operating of the parking brake. Advantageously, the operating element is the selector lever or a switch or key on the selector lever or on the steering wheel. There is also a mechanical emergency release system by which, particularly from the passenger compartment, the parking position can be canceled. This, advantageously in the case of a failure of the electric system, permits the operating of an emergency release which cancels the "parking position engaged" condition. This may be required for towing the vehicle.

In the case of another preferred embodiment of the invention, the ignition lock is provided with an impedance element which permits the withdrawal of the ignition key only when the driving speed is equal to zero or when the driving speed is equal to zero and the service brake is simultaneously operated. The use of an electromagnetic impedance element is particularly advantageous. This element can then be controlled, for example, by a control device for an anti-lock system.

In the case of another advantageous embodiment of the invention, the electric transmission control device will engage a driving position for the driving operation of the motor vehicle only if the service brake is simultaneously operated. In this case, the existence of an acoustic and/or visual warning device is advantageous which will then be operated when it is attempted to engage a driving position for the driving operation without operating the service brake.

Other objects, advantages and novel features of the present invention will become apparent from the following detailed description of the invention when considered in conjunction with the accompanying drawings.

DETAILED DESCRIPTION OF THE DRAWINGS

Figure 1:
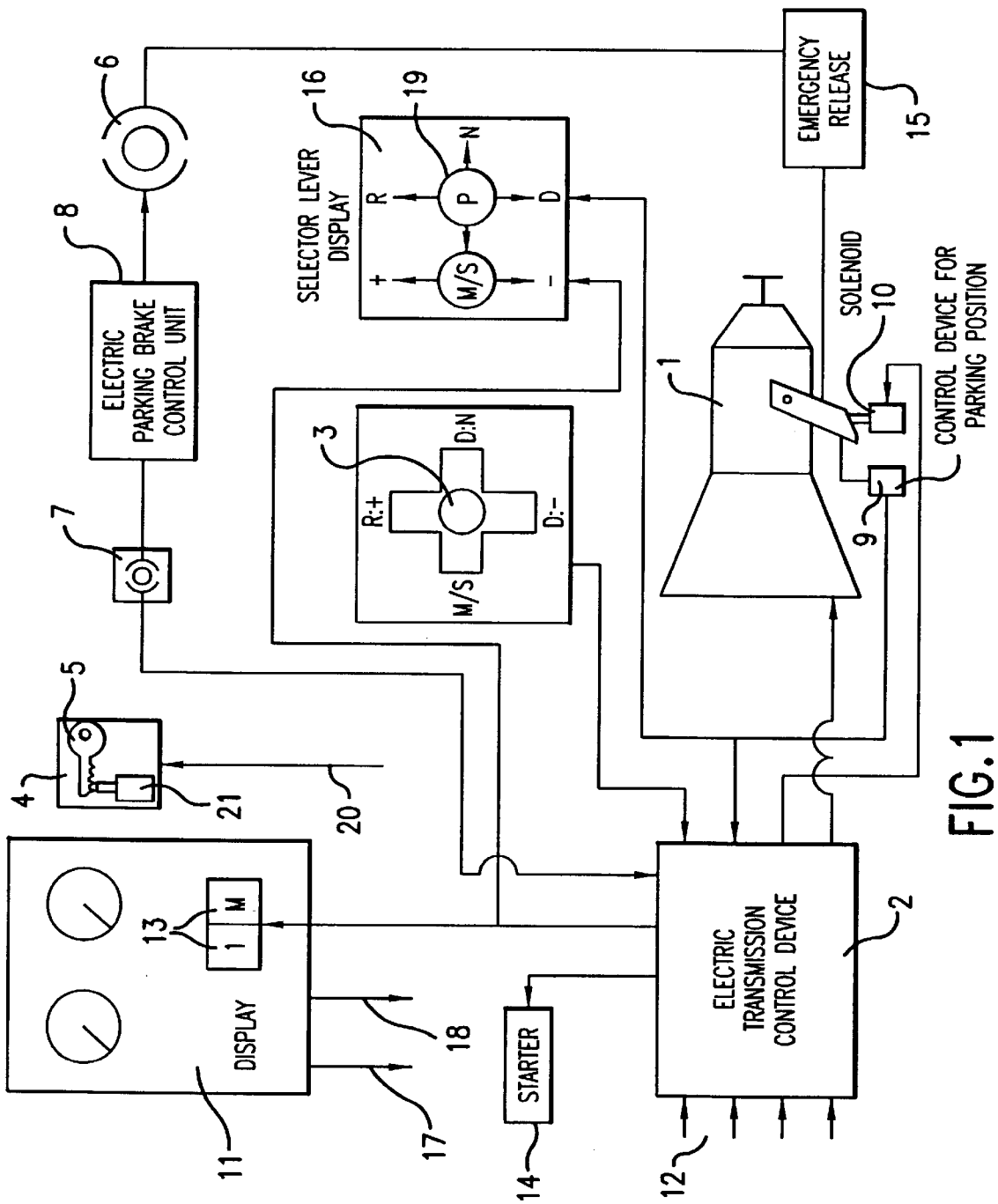
FIG. 1 is a schematic representation of a signal flow chart of a transmission control device according to the invention.

According to FIG. 1, an automatic motor vehicle transmission 1, in the case of which the individual gears, in addition, can also be controlled manually by way of a selector lever 3, is controlled by a symbolically indicated electric transmission control deice 2. In the automatic operation of the motor vehicle transmission 1, this electric transmission control device 2 causes the engaging of the driving positions R, N, D or P, according to the position of the selector lever 3. Furthermore, during manual operation, the electric transmission control device causes the shifting into the next driving operation position according to the corresponding selector lever signal.

The selector lever 3 can be moved along the directions of a rectangular system of coordinates, each moving direction causing the engaging of a driving position. In addition, for engaging the position P for activating the parking position, operating data of the motor vehicle present in the automatic motor vehicle transmission 1 are reported to the electric transmission control device 2. This includes, for example, the speed of the motor vehicle, the rotational speed of the motor vehicle engine and the position of the service brake, indicated by the arrows 12. Furthermore, a signal from an ignition lock 4 is also required as to whether an ignition key 5 is situated in the ignition lock 4.

The motor vehicle is equipped with an electric parking brake 6 which is used, if necessary, for braking the motor vehicle under operating conditions in which the parking position in the automatic motor vehicle transmission 1 is released. The electric parking brake 6 can be operated by the driver by way of an operating device 7. The operating signal from the operating device 7 goes to a control device 8 for the electric parking brake 6 and from there to the electric parking brake 6 itself. A control device 9 for engaging the parking position P as a function of other operating parameters is also shown. It is acted upon by the signals of the ignition lock 4, the vehicle speed v and the rotational speed n of the engine. On the automatic motor vehicle transmission 1 itself, a solenoid 10 is mounted which, as an impedance element, prevents the engaging of the parking position. In this case, a spring, which is not shown, is prestressed in the automatic motor vehicle transmission 1. The spring force causes the parking position to engage when the solenoid 10 is energized and in the case of the corresponding operating conditions.

The electric transmission control device 2 also controls a combination display 11 which indicates the currently engaged driving position 13 to the driver. Under certain circumstances, the combination display 11 can also trigger a backup light 17 and a backup audio alarm 18 via the signal lines shown.

In addition, the electric transmission control device 2 controls a starter interlock 14.

An emergency release 15 is connected with the brake 6 as well as with the parking position of the automatic transmission.

A selector lever display 16 within the driver's field of view shows the currently engaged driving position as well as the respective shifting possibilities for the selector lever 3. The currently engaged position appears in the center (here, P) and is emphasized by coloring, brightness or by an illuminated or colored frame 19. It is also conceivable that the currently selected position is darkened in the shifting diagram of the display device 16; or all momentarily selectable directions and/or functions or selector lever positions can be differentiated by means of color or brightness from the directions in the display device 16 which momentarily cannot be selected.

The arrow 20 symbolizes that a solenoid 21 can lock or release the ignition key 5 in the ignition lock 4, controlled by the electric transmission control device 2, depending on the condition of the operating parameters such as the speed and brake signal.

Figure 2:
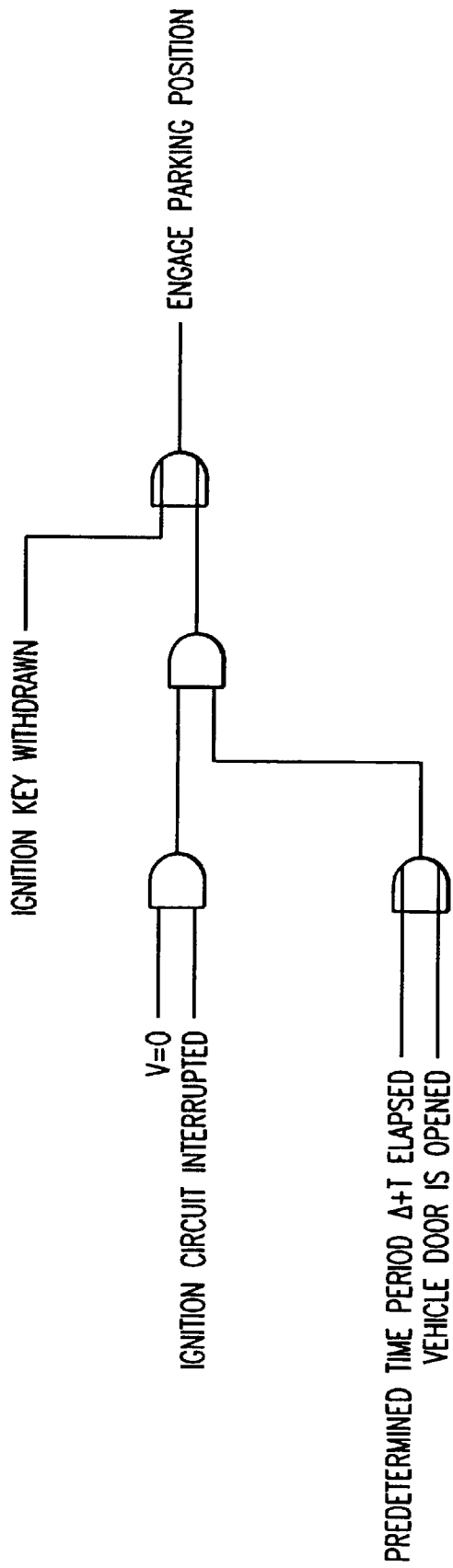
FIG. 2 is a connection diagram for engaging the parking position illustrated by logic operations.

By means of logical operations, it is illustrated in FIG. 2 that the parking position in the automatic transmission is engaged when the driving speed v of the motor vehicle is equal to zero and simultaneously the ignition circuit was interrupted by means of the ignition key and then a predetermined time period has elapsed or the vehicle door is then opened. Or, no later when the ignition key 5 is removed from the ignition lock 4. When these two conditions are met, the parking position is also engaged. This takes place by the energizing of the solenoid 10 in FIG. 1.

During the operation of the motor vehicle, the parking position will be electrohydraulically released when the rotational speed n of the engine is not zero; thus when the engine in running, and when one of the driving positions R, N or D is engaged. By means of the automatic engaging of the parking position as a function of other operating parameters of the motor vehicle than the selector lever position, it is possible to design the selecting device with the selector lever 3 such that only the three positions R, N, D are constructed as key functions and the manual step-by-step shifting function. For this purpose, a holding function by way of an electric control may also be implemented. In this case, the automated parking position is operative only when the engine is not running. In addition, an engaging of the parking position can be prevented by the solenoid 10 when the engine is stopped. The parking position is automatically operated when the engine is stopped and the driving speed is equal to zero, but no later then when the ignition key is withdrawn. When the engine is running, the motor vehicle is stopped only by way of an electric brake 6. Since, when the ignition key 5 is withdrawn from the ignition lock 4, the parking position is always engaged, for implementing an interlock function, it is only necessary to prevent the withdrawal of the ignition key 5 from the ignition lock 4 during the drive.

For implementing a shift-lock function, it is necessary that the movements of the selector lever 3 for engaging the driving positions R or D are transmitted only when the service brake is operated simultaneously.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle having an engine and an automatically shifted transmission, said automatically shifted transmission having at least one selecting device as an operating element thereof, comprising:

an electric transmission control device operable via a driver using said at least one selecting device, said electric transmission control device controlling a parking position function of the automatically shifted transmission as a function of a driving position selected by said at least one selecting device and other operating parameters of the motor vehicle;

wherein said parking position is engaged in the automatically shifted transmission when a driving speed of the motor vehicle is zero and, simultaneously, an ignition circuit is interrupted, and after one of an elapsing of a predetermined time period and an opening of a vehicle door; and wherein said parking position is engaged in all cases no later than when an ignition key is removed from an ignition lock.

2. The motor vehicle according to claim 1, wherein the engagement of the parking position is prevented when a driving position N is selected via the selecting device immediately before a switching-off of the engine, or within a predetermined time period after the switching-off of the engine.

3. The motor vehicle according to claim 1, wherein a release of the parking position occurs hydraulically and a spring is prestressed during said release.

4. The motor vehicle according to claim 2, wherein a release of the parking position occurs hydraulically and a spring is prestressed during said release.

5. The motor vehicle according to claim 3, further comprising a solenoid as an impedance element by which said engagement of the parking position is preventable.

6. The motor vehicle according to claim 5, wherein said impedance element cancels an impeding effect only when a position P is engaged.

7. The motor vehicle according to claim 5, wherein said impedance element does not exercise an impeding effect during said release of the parking position.

8. The motor vehicle according to claim 6, wherein said impedance element does not exercise an impeding effect during said release of the parking position.

9. The motor vehicle according to claim 1, wherein said at least one selecting device is a selector lever movable in at least two operating planes situated approximately perpendicularly with respect to one another, said selector lever automatically returning to a starting position in a central location.

10. The motor vehicle according to claim 1, further comprising a display device which displays to the driver a driving position adjustably selected via the selecting device, said selecting device being a selector lever.

11. The motor vehicle according to claim 10, wherein said display device additionally displays shifting possibilities for the selector lever.

12. The motor vehicle according to claim 10, wherein said display device comprises a further display plane such that more than four different functions are assignable to four moving directions of the selector lever, said more than four different functions being displayable via the display device.

13. The motor vehicle according to claim 11, wherein said display device comprises a further display plane such that more than four different functions are assignable to four moving directions of the selector lever, said more than four different functions being displayable via the display device.

14. The motor vehicle according to claim 1, further comprising a display device having a display controlled in all driving positions via said electric transmission control device; and a sensor arranged in the transmission to determine an engaged driving position P, said sensor controlling the display device.

15. The motor vehicle according to claim 14, wherein when the ignition is switched off, said electric transmission control device is switched off when the display device is controlled via the sensor in the transmission.

16. The motor vehicle according to claim 15, wherein the display of the display device is switched off when the ignition is switched off and the driving position P is engaged after a predetermined time period, or when an ignition key is removed from an ignition lock with a switching-off of load devices, or when a door lock of the motor vehicle is operated.

17. The motor vehicle according to claim 1, further comprising an additional operating element by which the driver engages the parking position.

18. The motor vehicle according to claim 17, wherein the engaging of the parking position via the additional operating element operates a parking brake.

19. The motor vehicle according to claim 1, wherein an ignition lock is provided with an electromagnetic impedance element which permits withdrawal of said ignition key only when the driving speed is equal to zero or when the driving speed is equal to zero and the service brake is simultaneously operated.

20. The motor vehicle according to claim 19, wherein said electromagnetic impedance element is controlled via at least one of a transmission control device and a brake control device.

21. The motor vehicle according to claim 1, wherein via said electric transmission control device, a driving position for a driving operation of the motor vehicle is engaged only if a service brake is simultaneously operated.

22. The motor vehicle according to claim 21, wherein at least one of an acoustic and visual signal device is operated when an attempt to engage a driving position is made for a driving operation without operating the service brake.

23. The motor vehicle according to claim 1, wherein said parking position is made inoperative via a mechanical emergency release system.

24. The motor vehicle according to claim 23, wherein said mechanical emergency release system is operable from a passenger compartment of the motor vehicle.

25. A method of operating an automatic transmission in a motor vehicle having an engine, said automatic transmission having a selecting device as an operating element by which a driver controls an electric transmission control unit, which electric transmission control unit controls a parking position of the automatic transmission as a function of a driving position selected via the selecting device, the method comprising the steps of:

automatically engaging the parking position function in the automatic transmission upon the following conditions:

determining a driving speed of the motor vehicle to be zero and, simultaneously, an ignition circuit to be interrupted; and when one of a predetermined time period has elapsed and a vehicle door is opened;

automatically engaging the parking position in the automatic transmission in any event no later than when an ignition key is determined to be removed from an ignition lock.

* * * * *